(12) United States Patent
Chen et al.

(10) Patent No.: US 6,605,391 B2
(45) Date of Patent: Aug. 12, 2003

(54) SOLID GEL MEMBRANE

(75) Inventors: Muguo Chen, West Harrison, NY (US);
Tsepin Tsai, White Plains, NY (US);
Wayne Yao, Bergenfield, NJ (US);
Yuen-Ming Chang, Elmsford, NY (US);
Lin-Feng Li, Croton-on-Hudson, NY (US);
Karen Tom, Livingston, NJ (US)

(73) Assignee: Reveo, Inc., Elmsford, NY (US)

(*) Notice: Subject to any disclaimer, the term of this patent is extended or adjusted under 35 U.S.C. 154(b) by 0 days.

(21) Appl. No.: 09/259,068

(22) Filed: Feb. 26, 1999

(65) Prior Publication Data

US 2003/0099872 A1 May 29, 2003

(51) Int. Cl.[7] .............................. H01M 2/14; H01M 8/10
(52) U.S. Cl. ........................................ 429/303; 429/29
(58) Field of Search ................................. 204/606, 616; 429/303, 27, 28, 29; 521/25

(56) References Cited

U.S. PATENT DOCUMENTS

| | | | | |
|---|---|---|---|---|
| 3,871,918 A | * | 3/1975 | Viescou | 136/30 |
| 4,118,551 A | | 10/1978 | Chireau et al. | 429/207 |
| 4,378,414 A | | 3/1983 | Furukawa et al. | 429/144 |
| 4,585,710 A | | 4/1986 | McEvoy | 429/27 |
| 4,664,761 A | * | 5/1987 | Zupancic et al. | 204/129 |
| 4,681,698 A | | 7/1987 | Graham et al. | 252/182.1 |
| 4,708,981 A | * | 11/1987 | Zupancic et al. | 525/59 |
| 5,128,799 A | | 7/1992 | Byker | 359/265 |
| 5,183,872 A | | 2/1993 | Heidel et al. | 527/300 |
| 5,468,574 A | | 11/1995 | Ehrenberg et al. | 429/33 |
| 5,549,988 A | | 8/1996 | Reichert et al. | 429/192 |
| 5,650,060 A | * | 7/1997 | Huang et al. | 205/730 |
| 5,688,613 A | | 11/1997 | Li et al. | 429/192 |

FOREIGN PATENT DOCUMENTS

| | | |
|---|---|---|
| EP | 0 323 006 A2 | 7/1989 |
| EP | 0 474 617 A1 | 3/1992 |
| EP | 0 651 455 A1 | 5/1995 |
| JP | 0715348.9 A | 6/1995 |
| WO | WO 97/34186 | 9/1997 |

* cited by examiner

*Primary Examiner*—Carol Chaney
(74) *Attorney, Agent, or Firm*—Heslin Rothenberg Farley & Mesiti PC; Ralph J. Crispino

(57) ABSTRACT

A highly conductive polymer based solid gel membrane is disclosed. The membrane is especially well suited for use in such electrochemical devices as, for example, aluminum/air, zinc/air, $Zn/MnO_2$, Ni/Cd and hydrogen fuel cells, as well as in electrochromic devices such as smart windows and flat panel displays. In accordance with the principles of the invention, anion- and cation-conducting membranes are formed. The gel composition of the membrane contains the ionic species within its solution phase such that the species behaves as in a liquid electrolyte, while at the same time, the solid gel composition prevents the solution phase from diffusing into the device. Methods of forming polymer based solid gel membranes of the present invention are also disclosed.

12 Claims, 5 Drawing Sheets

Zinc/air fuel cell

Zinc/air fuel cell

Zinc/air fuel cell

Aluminum/air fuel cell

Hydrogen/air fuel cell

SOLID GEL MEMBRANE

FIELD OF THE INVENTION

This invention relates generally to solid gel membranes, and more particularly to a solid gel membrane in which an ionic species is confined within the gel's solution phase.

BACKGROUND OF THE INVENTION

Electrochemical devices generally incorporate an electrolyte source to provide the anions or cations necessary to produce an electrochemical reaction. A zinc/air fuel cell battery, for example, requires the diffusion of hydroxide anions, and typically will incorporate an aqueous potassium hydroxide solution as the electrolyte. The lifetime of these battery is however, limited for several reasons. First, the naked zinc anode is corroded by both the aqueous electrolyte and air. Second, the air channels of the air cathode gradually become blocked by water from the electrolyte solution and third, the electrolyte solution becomes contaminated with zinc oxidation product that diffuses from the anode.

Various methods have been used to address the many problems associated with the use of aqueous electrolytes in zinc anode based systems such as zinc/air fuel cells. Additives, for example, have been introduced into the electrolyte solution to extend its lifetime and to protect the anode from corrosion. U.S. Pat. No. 4,118,551 discloses the use of inorganic additives such as mercury, indium, tin, lead, lead compounds, cadmium or thallium oxide to reduce corrosion of a zinc electrode. Many of these additives however, are expensive and more significantly, are very toxic. U.S. Pat. No. 4,378,414 discloses the use of a multi-layer separator between the positive and negative electrodes to reduce corrosion of the anode and contamination of the electrolyte by zinc oxidation products. In addition, hydrophobic materials have been introduced into zinc/air devices to prevent water permeation into the air channels of the cathode. Introduction of hydrophobic materials is however, a difficult process and may result in decreased performance of the cathode.

In addition to zinc/air systems, other metal/air systems, such as aluminum/air systems, also have the potential for many different applications due to their theoretically high ampere-hour capacity, voltage, and specific energy. In actual practice however, these very promising theoretical values are greatly reduced due to the corrosion of the metal anode in the electrolyte.

A solid state hydroxide conductive electrolyte polybenzimidazole ("PBI") film is disclosed in U.S. Pat. No. 5,688,613 and comprises a polymeric support structure having an electrolyte active species dispersed therein, wherein the polymer structure is in intimate contact with both the anode and the cathode. This PBI film, however, does not absorb water and therefore, does not hold water within the membrane, causing it to dry out quickly.

U.S. Pat. No. 3,871,918 discloses an electrochemical cell embodying an electrode of zinc powder granules suspended in a gel comprised of methylenebisacrylamide, acrylic acid and acrylamide. Potassium hydroxide serves as the electrolyte, and is contained within the gel.

With regard to devices that rely on the conduction of cations, while there has been a significant amount of research in this area, most proton conducting membranes are very expensive to produce and typically do not function at room temperature. In the 1970's for example, a fully fluorinated polymer membrane, NAFION® (DuPont, Wilmington, Del. USA) was introduced and has served as the basis from which subsequent proton conducting membranes have evolved.

U.S. Pat. No. 5,468,574 discloses a proton conductive membrane that is characterized as a highly sulfonated polymeric membrane composed of block copolymers of sulfonated polystyrene, ethylene and butylene blocks. In 1997, NASA's Jet Propulsion Laboratory disclosed the development of an improved proton conductive membrane composed of sulfonated poly(ether ether ketone), commonly known as H-SPEEK.

An electrochemical reaction is also involved in the function of electrochromic devices (ECD's). Electrochromism is broadly defined as a reversible optical absorption change induced in a material by an electrochemical redox process. Typically, an electrochromic device contains two different electrochromic materials (ECM's) having complementary properties; the first is generally reduced, undergoing a color (1)-to-color (2) transition during reduction, while the second material is oxidized, undergoing a similar transition upon the loss of electrons.

Basically, there are two types of electrochromic devices, depending upon the location of the electrochromic materials within the device. In a thin-film type device, the two ECM's are coated onto the two electrodes and remain there during the redox coloration process. In a solution-phase device, both ECM's are dissolved in an electrolyte solution and remain their during the coloration cycle. The solution-phase device is typically more reliable and has a longer lifetime, however, in order to maintain the colored state, an external power source must be continuously applied. As the thin-film type device does not need an external power source to maintain its colored state, power consumption is greatly reduced, making this an advantage for such energy-saving applications as smart windows. The drawback of the thin-film type device is that it has a short lifetime. After a certain number of cycles, ECM films can lose contact with the electrode, or they may no longer be capable of phase change and the device expires.

With regard to solution-phase devices, U.S. Pat. No. 5,128,799, for example, discloses a method of reducing the current required to maintain the colored state which involves the addition of gel into the device. While reducing energy consumption however, the addition of the gel into the device also greatly reduces the switching speed of the device. With regard to thin-film devices, attempts to extend the lifetime of the device have included changes to the crystal structure of the film. While such changes have increased the lifetime of thin-film devices to an extent, the typical lifetime of such devices is still not satisfactory.

The foregoing problems thus present major obstacles to the successful development and commercialization of fuel cell technology, a green energy source, and of electrochromic devices such as smart windows and flat panel displays, which have several energy-saving and decorative applications.

SUMMARY OF THE INVENTION

The present invention provides polymer based solid gel membranes that contain an ionic species within the gel's solution phase and that are highly conductive to anions or cations. In accordance with the principles of the invention, solid gel membranes may be produced for use in such power sources as, for example, zinc/air, aluminum/air, Zn/MnO$_2$, Ni/Cd, and hydrogen fuel cells, as well as for use in electrochromic devices, such as smart windows and flat panel displays.

With respect to a zinc/air fuel cell battery, for example, conductive membranes of the present invention may be used to protect the anode, as well as the cathode. In such a system, the ionic species is contained within the solution phase of the solid gel membrane, allowing it to behave as a liquid electrolyte without the disadvantages. The gel membrane protects the anode from corrosion (by the electrolyte as well as by air) and prevents zinc oxidation product from the anode from contaminating the electrolyte. With regard to the cathode, as the membrane is itself a solid, there is no water to block the air channels of the cathode. As a result, the system will have an extended lifetime.

Accordingly, the principles of the present invention relate to an electrochemical cell comprising first and second electrodes and one or more polymer based solid gel membranes disposed there between. In one embodiment, the electrochemical cell is a zinc/air cell having an anode protective solid gel membrane and a hydroxide conducting solid gel membrane disposed between the zinc anode and the air cathode. In another embodiment of a zinc/air system, both the anode and cathode are protected by a solid gel membrane of the present invention, and an aqueous electrolyte is disposed between the two.

In a further embodiment of this aspect of the invention, the electrochemical cell is an aluminum/air cell, wherein a hydroxide conductive solid gel membrane is applied to the aluminum anode to protect it from corrosion.

Accordingly, the principles of the present invention also provide a method of inhibiting corrosion of a metal anode in a metal/air fuel cell system comprised of a metal anode and an air cathode. The method comprises disposing one or more polymer based solid gel membranes between said anode and said cathode.

In yet a further embodiment of the invention, the electrochemical cell is a proton or hydroxide conducting power source, such as a hydrogen fuel cell system. In this embodiment, a proton or hydroxide conductive solid gel membrane may be sandwiched between the hydrogen anode and the air cathode, thus separating the hydrogen and the air, while allowing the diffusion of hydroxide ions. This embodiment provides several advantages over prior art proton conducting membranes in that the solid gel membranes of the present invention are much easier and less expensive to produce than earlier membranes and, more importantly, unlike previous membranes, the solid gel membranes of the present invention will function efficiently at room temperature.

The principles of the present invention may also be applied to electrochromic devices. Here, the electrochromic materials of the device are contained within solid gel membranes, thus providing the device with the reliability and long lifetime associated with solution phase EC systems, and also the energy-saving memory properties associated with thin-film EC systems.

Accordingly, yet another embodiment of the present invention is an electrochromic device wherein electrochromic materials are contained within polymer based solid gel membranes. Typically, such a device will involve two electrode substrates and electrochromic materials contained within solid gel membranes sandwiched there between. The device may optionally include an aqueous or a solid electrolyte disposed between the solid gel membranes. The electrode substrates may be comprised of such materials as, for example, platinum, gold, conductive glass, such as indium-tin oxide glass, and the like.

BRIEF DESCRIPTION OF THE DRAWINGS

Numerous other advantages and features of the present invention will become readily apparent from the following detailed description of preferred embodiments when read in conjunction with the accompanying drawings, wherein.

DETAILED DESCRIPTION OF PREFERRED EMBODIMENTS

Figure 1:
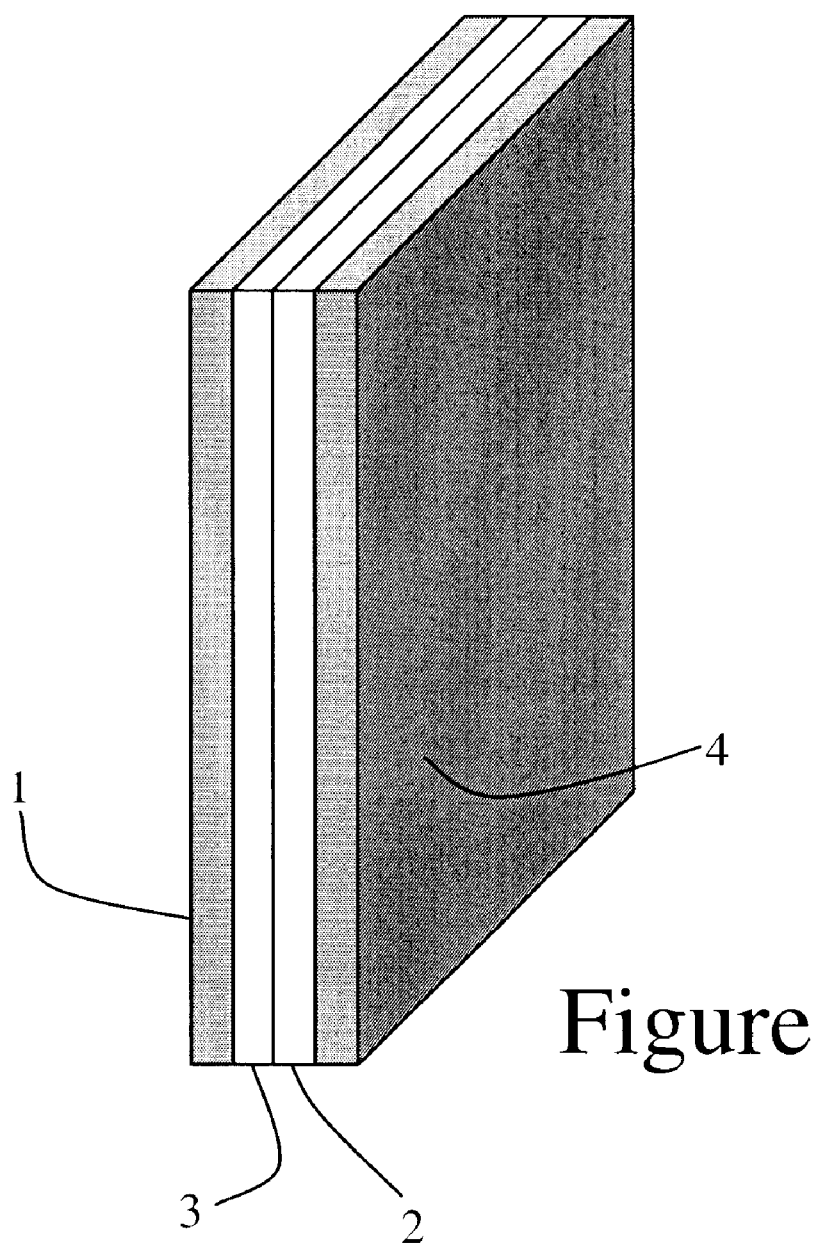
FIG. 1 is a schematic depiction of a zinc/air fuel cell incorporating an anode protective membrane and a hydroxide conducting membrane of the present invention.
Figure 2:
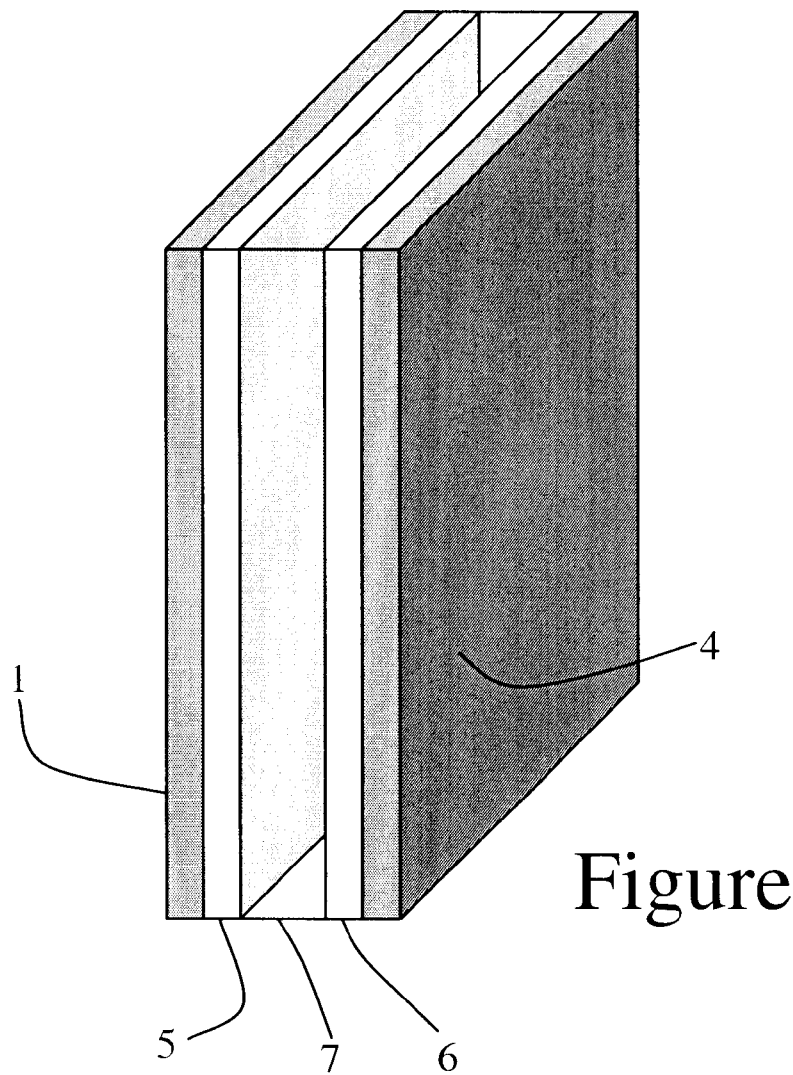
FIG. 2 is a schematic depiction of another embodiment of a zinc/air fuel cell incorporating both an anode and a cathode protective membrane of the present invention.

Referring now to the drawings, FIG. 1 depicts a typical zinc/air fuel cell, wherein two polymer based solid gel membranes (1, 2) are disposed between the zinc anode (3) and the air cathode (4). The first is an anode protective membrane (1) and the second is a hydroxide conductive membrane (2). The membranes are not only the source of ionic species, and are highly conductive to that species, but they also provide a protective layer to the electrodes to prevent the usual sources of cell destruction. The membranes prevent diffusion of zinc oxidation product into the electrolyte solution phase, they prevent corrosion of the zinc anode by either the electrolyte solution or air, and they prevent blockage of the cathode air channels by water from the electrolyte solution. The zinc/air system of FIG. 2 includes a protective and conductive solid gel membrane (5, 6) on the surface of the zinc anode (3) and the air cathode (4), and an aqueous electrolyte (7) between the two.

Figure 3:
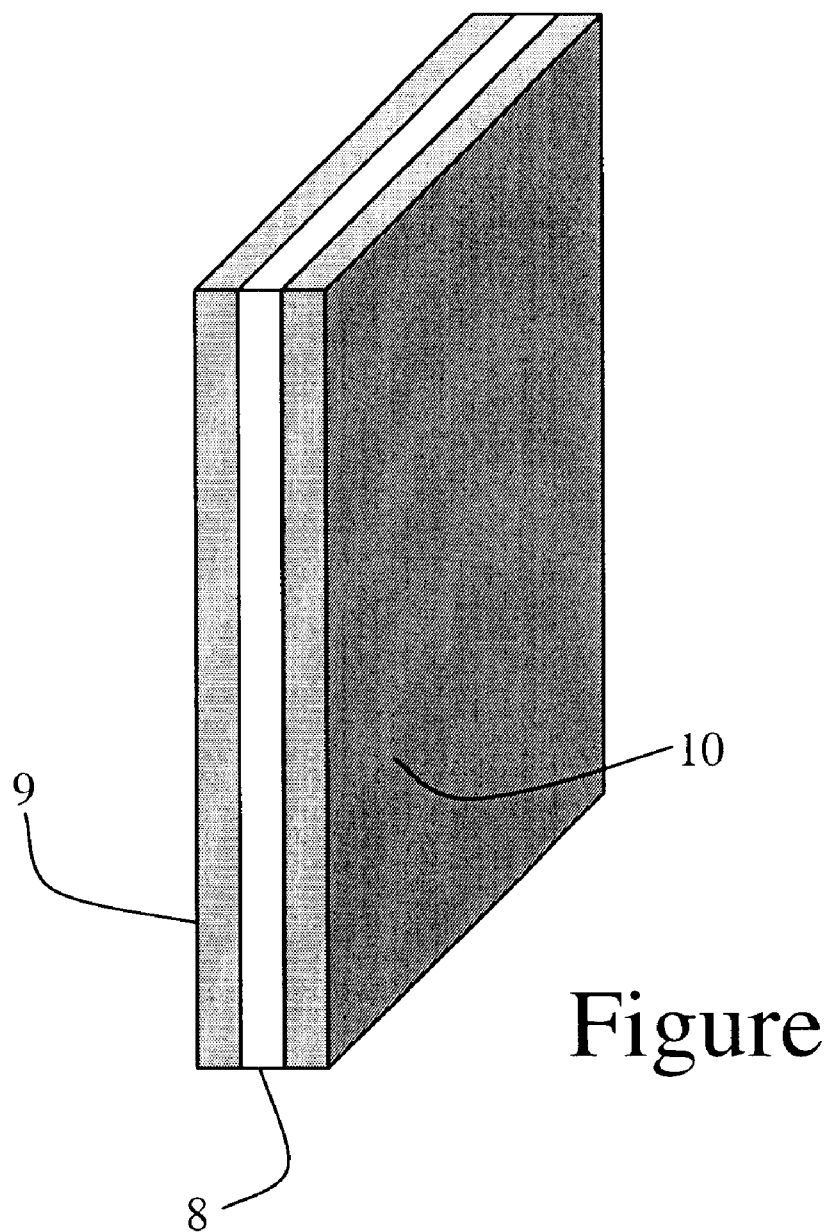
FIG. 3 is a schematic depiction of an aluminum/air fuel cell incorporating a hydroxide conductive membrane of the present invention.

Referring now to FIG. 3, an aluminum/air fuel cell system incorporating a solid gel hydroxide conductive membrane (8) between the aluminum anode (9) and the air cathode (10) is depicted. As in the zinc/air system, the solid gel membrane of this embodiment serves to prevent the corrosion problems associated with the use of pure liquid electrolyte.

Figure 4:
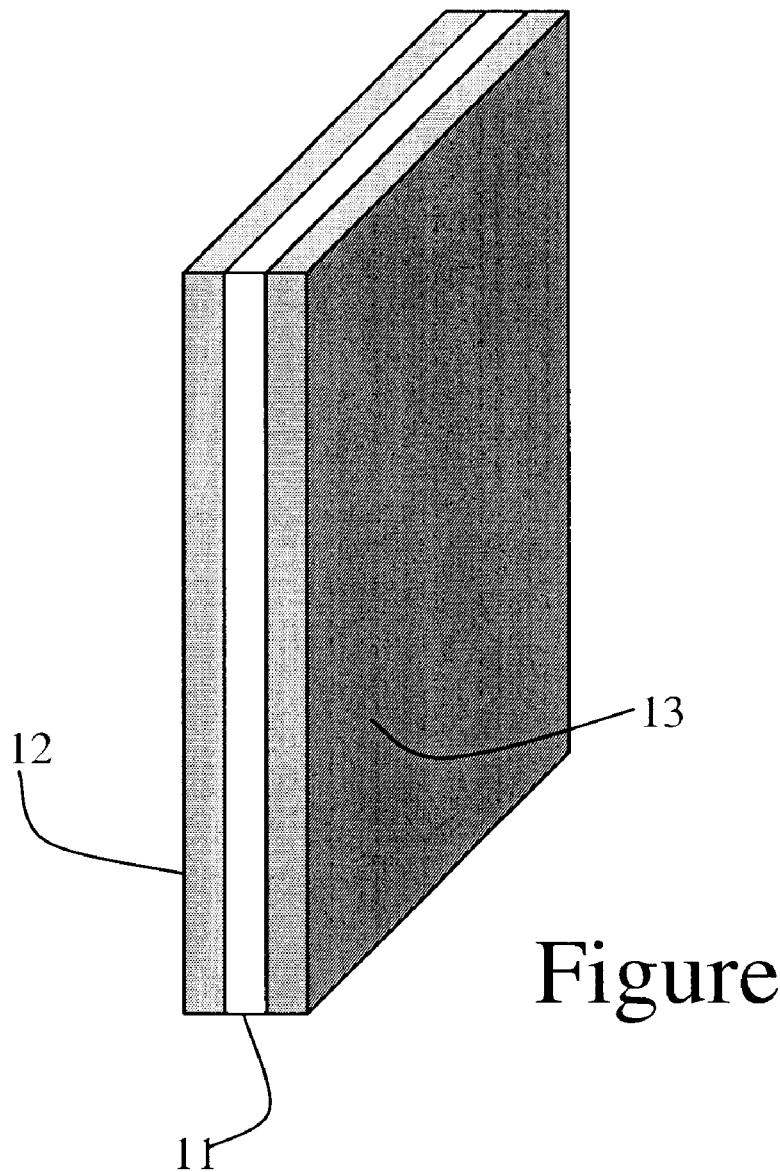
FIG. 4 is a schematic depiction of a hydrogen/air fuel cell incorporating a proton or hydroxide conductive membrane of the present invention.

As illustrated in FIG. 4, when applied to the art of hydrogen fuel cells, the principles of the present invention provide a proton or hydroxide conductive membrane that is easy to produce, much less expensive than existing proton conductive membranes and that functions well at room temperature. Because the actual conducting media remains in aqueous solution within the polymer gel backbone, the conductivity of the membrane is comparable to that of liquid electrolytes, which at room temperature is significantly high. In this embodiment of the invention, a proton or hydroxide conductive solid gel membrane (11) is sandwiched between the hydrogen anode (12) and the air cathode (13), thereby separating the hydrogen and the air.

Figure 5:
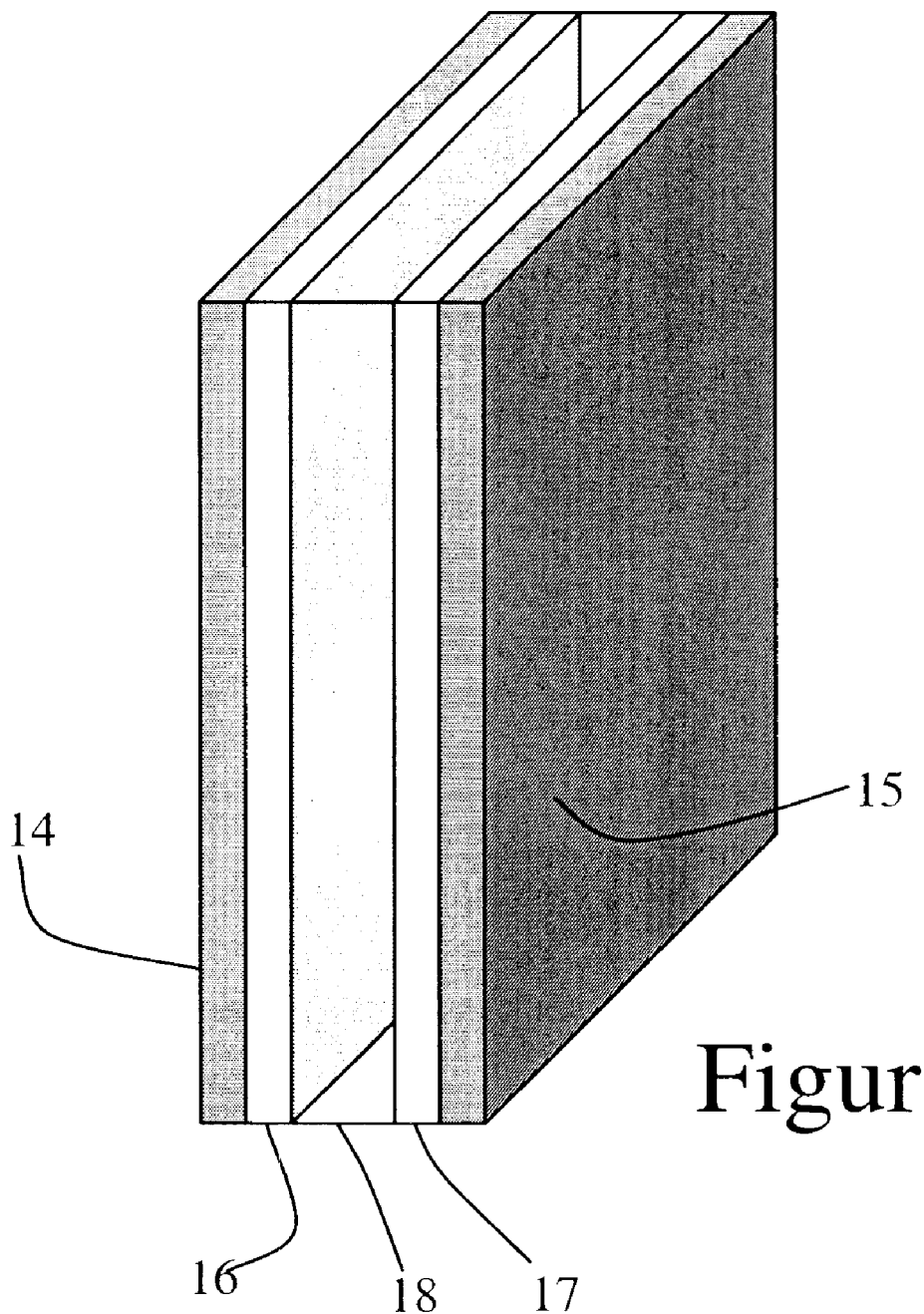
FIG. 5 is a schematic depiction of an electrochromic device wherein the electrochromic materials are contained within membranes of the present invention.

As shown in FIG. 5, the principles of the present invention may also be applied to electrochromic systems. Here, the electrochromic materials are dispersed within the solution phase of the polymer gel backbone of a solid gel membrane. Since the ECM's are in solution, the device exhibits the superior reliability and long life of a solution phase device and in addition, because the ECM's are physically confined, they can not diffuse into the device's bulk electrolyte and the device therefore also exhibits the superior memory of a thin-film type device. As shown, the device includes two electrode substrates (14, 15) having solid gel membrane encapsulated electrochromic materials (16, 17) there between. As illustrated, the device optionally includes an aqueous or solid electrolyte (18) disposed between solid gel membranes (16, 17).

EXAMPLES

Preferred embodiments of the present invention are hereinafter described in more detail by means of the following examples that are provided by way of illustration and not by way of limitation.

Example 1

The following procedure was used to prepare a strong polymer film for use in the present invention. 0.75 grams methylenebisacrylamide, 0.56 g acrylamide, 4.70 g methacrylic acid, and 0.25 g poly(sodium 4-styrenesulfonate) were dissolved in 10 milliliters water and then 20 ml 40% KOH was added to the resulting solution, which was maintained at room temperature. 0.05 g ammonium persulfate was then added to the solution. A piece of fabric was soaked in the resulting monomer solution and then sandwiched between a piece of glass and a piece of PET transparent film. This was heated on a 75° C. hotplate for 1 minute and then irradiated under strong UV light for 5 minutes, whereby a strong polymer film was formed.

The resulting film is highly conductive of hydroxide ions, making it suitable for use in an alkaline hydrogen fuel cell. Here, the membrane film is sandwiched between an air cathode and a hydrogen anode, separating the air and hydrogen, while allowing the diffusion of hydroxide ions.

Example 2

In this example, a polymer based solid gel membrane was prepared in accordance with the principles of the invention and applied to the surface of a cathode. 0.75 g methylenebisacrylamide, 0.56 g acrylamide, 4.70 g methacrylic acid, and 1.5 g polysulfone (anionic) were dissolved in 10 ml water and then 20 ml 40% KOH was added to the resulting solution, which was maintained at room temperature. 0.038 g ammonium persulfate dissolved in 1 ml water was added and the resulting solution was poured onto the surface of a cathode. The cathode was then covered by a piece of PET film and heated on a 75° C. hotplate for 1 minute and then irradiated under strong UV light, whereby a strong polymer film was formed.

This cathode may be used with an anode prepared as in Example 3, below, or it may be used directly with a plain zinc sheet or plain aluminum sheet in the formation of a zinc/air or aluminum/air fuel cell battery.

Example 3

A polymer based ion conducting membrane was prepared and applied to the surface of an anode according to the principles of the present invention. 0.75 g methylenebisacrylamide, 1.5 g poly(sodium 4-styrenesulfonate), 5.18 g 1-vinyl-2-pyrrolidinone, and 3.36 g acrylic acid were dissolved in 30 ml $NH_4Cl$ and $K_2SO_4$ saturated aqueous solution. The solution was spread onto the anode surface, and covered by a PET film and then irradiated under strong UV light, whereby a strong polymer film was formed.

Example 4

A polymer based solid gel membrane was prepared according to the present invention and processed to form a hydrogen conducting film. 6.4 g 70% perchloride acid, 0.75 g methylenebisacrylamide, 5.18 g acrylic acid, and 0.1 g potassium sulfite were dissolved in 27 ml water and then 0.1 g ammonium persulfate was added to the solution. A piece of fabric was soaked in the resulting monomer solution and then sandwiched between a piece of glass and a piece of PET transparent film. This was heated on an 85° C. hotplate for 1 minute and then irradiated under strong UV light for 8 minutes, whereby a strong polymer film was formed.

The resulting film is highly conductive of hydrogen ions, making it suitable for use in a hydrogen fuel cell. In this embodiment, the membrane film is sandwiched between an air cathode and a hydrogen anode, separating the air and hydrogen while allowing the diffusion of hydrogen ions.

Example 5

The principles of the present invention may also be applied to electrochromic devices. For example, one or several electrochromic materials are dissolved in an aqueous monomer solution which is then applied to an electrode substrate. The substrate may be comprised of such materials as for example, platinum, gold, conductive glass, e.g., indium-tin oxide glass, or other electro-conductive materials. The solution is polymerized according to either of the above methods wherein the ECM's are contained within the polymer membrane formed on the surface of the substrate. Two such modified electrodes, containing the same or different ECM's, are used in the electrochromic device with one acting as the anode and the other as the cathode. The electrodes may be packed together as a complete display device or they may be separated by a liquid or solid electrolyte.

Examples of other monomers that may be used in the formation of a solid gel membrane of the invention include any water-soluble ethylenically unsaturated amides or acids, including, but not limited to, N-isopropylacrylamide, fumaramide, fumaric acid, N, N-dimethylacrylamide, 3,3-dimethylacrylic acid, and the sodium salt of vinylsulfonic acid.

Other cross-linking agents may include, for example, any water-soluble N,N'-alkylidene-bis(ethylenically unsaturated amide).

Examples of polymers other than poly(sodium 4-styrenesulfonate) that may be used as reinforcing elements within the solid gel electrolyte may include any water-soluble or water-swellable polymers, such as, for example, carboxymethyl cellulose, polysulfone (anionic), sodium salt of poly(styrenesulfonic acid-co-maleic acid), and corn starch.

Suitable fabrics onto which the monomer solution may be applied include, for example, woven or non-woven fabrics of, for example, polyolefine, polyamide, and polyvinyl alcohol.

With regard initiation of the polymerization reaction, in addition to other chemical initiators such as, for example, alkali metal persulfates and peroxides, the reaction may be initiated by radical generating methods such as, for example, X-ray and the like.

This invention has been described in terms of specific embodiments, set forth in detail. It should be understood, however, that these embodiments are presented by way of illustration only, and that the invention is not necessarily limited thereto. The principles of the present invention may, for example, also be applied in the preparation of a solid gel membrane for use in such other electrochemical systems as for example, Ni/Cd and Zn/MnO$_2$ cells. Additionally, other monomers, polymers, polymerization initiators, reducing agents, and the like, other than those particularly disclosed herein might be used: Modifications and variations in any given material or process step will be readily apparent to those skilled in the art without departing from the true spirit and scope of the following claims, and all such modifications and variations are intended to be included within the scope of the present invention.

We claim:

1. A polymer based solid gel membrane for use in an electrochemical cell, said membrane having as its source of conducting media a basic ionic species contained within an aqueous solution phase of said polymer based gel, wherein said polymer based gel comprises the polymerization product of a polymerization initiator, a monomer selected from the group of water soluble ethylenically unsaturated amides and acids, and a reinforcing element selected from the group of water soluble and water swellable polymers, wherein said ionic species is added to said polymerization initiator, said monomer, and said reinforcing element prior to polymerization, and wherein said polymer based solid gel membrane is formed on a matrix of a woven or non-woven fabric, on a surface of an anode, or on a surface of a cathode.

2. A polymer based solid gel membrane according to claim 1 wherein the polymer based gel comprises the polymerization product of a polymerization initiator and:
   (a) methylenebisacrylamide, acrylamide, methacrylic acid, poly(sodium 4-styrenesulfonate);
   (b) methylenebisacrylamide, acrylamide, methacrylic acid, and polysulfone (anionic);
   (c) methylenebisacrylamide, poly(sodium 4-styrenesulfonate), acrylic acid, 1-vinyl-2-pyrrolidione and a reducing agent; or
   (d) methylenebisacrylamide, acrylic acid and a reducing agent.

3. The polymer based solid gel membrane according to claim 1, wherein said monomer is selected from the group of methylenebisacrylamide, acrylamide, methacrylic acid, 1-vinyl-2-pyrrolidione, N-isopropylacrylamide, fumaramide, fumaric acid, N, N-dimethylacrylamide, 3,3-dimethylacrylic acid, and the sodium salt of vinylsulfonic acid.

4. The polymer based solid gel membrane according to claim 1, wherein said reinforcing element is selected from the group of poly(sodium 4-styrenesulfonate), carboxymethyl cellulose, polysulfone (an ionic), sodium salt of poly(styrenesulfonic acid-co-maleic acid), and corn starch.

5. A polymer based solid gel membrane for use in an electrochemical cell, said membrane having a basic ionic species contained within an aqueous solution phase of a polymer based gel backbone, wherein said polymer based gel backbone comprises the polymerization product of a polymerization initiator, a monomer selected from the group of water soluble ethylenically unsaturated amides and acids, and a reinforcing element selected from the group of water soluble and water swellable polymers, wherein said ionic species is added to said polymerization initiator, said monomer, and said reinforcing element prior to polymerization, and wherein said polymer based solid gel membrane is formed on a matrix of a woven or non-woven fabric, on a surface of an anode, or on a surface of a cathode.

6. The polymer based solid gel membrane according to claim 5, wherein said ionic species comprises an aqueous KOH solution.

7. The polymer based solid gel membrane according to claim 5, wherein said ionic species comprises a basic aqueous solution.

8. The polymer based solid gel membrane according to claim 7, wherein said ionic species comprises an aqueous KOH solution.

9. A polymer based solid gel membrane for use in an electrochemical cell, said membrane having hydroxide ions contained within an aqueous solution phase of said polymer based gel, wherein said polvmer based gel comprises the polymerization product of a polymerization initiator, a monomer selected from the group of water soluble ethylenically unsaturated amides and acids, and a reinforcing element selected from the group of water soluble and water swellable polymers, wherein said ionic species is added to said polymerization initiator, said monomer, and said reinforcing element prior to polymerization, and wherein said polymer based solid gel membrane is formed on a matrix of a woven or non-woven fabric, on a surface of an anode, or on a surface of a cathode.

10. A polymer based solid gel membrane according to claim 9, wherein the polymer based gel comprises the polymerization product of a polymerization initiator and:
   (a) methylenebisacrylamide, acrylamide, methacrylic acid, poly(sodium 4-styrenesulfonate);
   (b) methylenebisacrylamide, acrylamide, methacrylic acid, and polysulfone (anionic);
   (c) methylenebisacrylaride, poly(sodium 4-styrenesulfonate), acrylic acid, 1-vinyl-2-pyrrolidione and a reducing agent; or
   (d) methylenebisacrylamide, acrylic acid and a reducing agent.

11. The polymer based solid gel membrane according to claim 9, wherein said monomer is selected from the group of methylenebisacrylarnide, acrylamide, methacrylic acid, 1-vinyl-2-pyrrolidione, N-isopropylacrylamide, fumaramide, fumaric acid, N, N-dimethylacrylamide, 3,3-dimethylacrylic acid, and the sodium salt of vinylsulfonic acid.

12. The polymer based solid gel membrane according to claim 9, wherein said reinforcing element is selected from the group of poly(sodium 4-styrenesulfonate), carboxymethyl cellulose polysulfone (anionic), sodium salt of poly(styrenesulfonic acid-co-maleic acid), and corn starch.

* * * * *